(No Model.)
A. L. SMITH.
FOCI-METER.
No. 255,468. Patented Mar. 28, 1882.
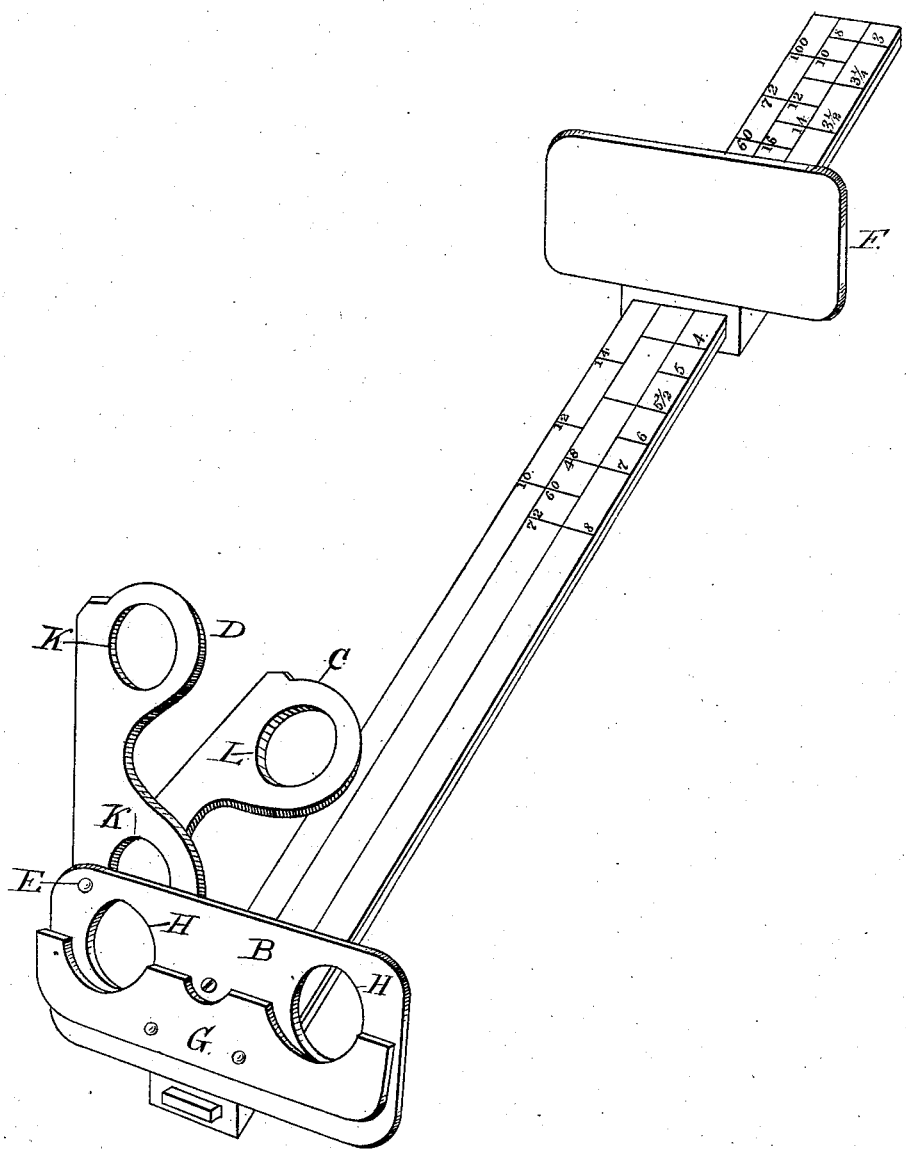
Witnesses
E. J. Rogers
E. Merritt Cole
Inventor:
Andrew L. Smith

UNITED STATES PATENT OFFICE.

ANDREW L. SMITH, OF GENEVA, NEW YORK.

FOCI-METER.

SPECIFICATION forming part of Letters Patent No. 255,468, dated March 28, 1882.

Application filed August 8, 1881. (No model.)

*To all whom it may concern:*

Be it known that I, ANDREW L. SMITH, a citizen of the United States, residing at Geneva, in the county of Ontario and State of New York, have invented a new and useful Foci-Meter, of which the following is a specification.

My invention relates to improvements in foci-meters, or instruments for measuring the focal length of optical lenses; and the objects of my improvements are, first, to accurately measure the focal length of lenses; second, to provide an instrument of simple construction, with few pieces, and not liable to get out of order or have its parts misplaced in using. I attain these objects by the mechanism illustrated in the drawing, in which—

A is a gage upon which is written or printed the necessary series of figures to read the focal length of lenses, and at one end of which is fixed the head B, to which are affixed the slides C and D by the pivot E, and the holder G by appropriate rivets or screws.

In the head B are set the lenses H H. In the slide C are set the lenses L L, and in slide D are set the lenses K K. The target F slides upon the gage A and receives the focal image made by light passing through lenses to be measured placed in the holder G and the lenses H H, K K, and L L, as desired. The object of the convex lenses H H is to shorten the focal length of convex lenses to be measured, so that lenses of from one to one hundred inches focal length may be measured in an instrument of my construction of not more than thirty inches length.

For the measurement of concave lenses, the slides D C, carrying the convex lenses K K L L, shut down behind the head B, so that the combined power of two or more convex lenses insures a positive image on F of light passing through concave lenses placed in G. In using my instrument to measure convex lenses, a pair of spectacles or eyeglasses, or a single lens, is placed in the holder G, and the instrument is held so that light from a window or lamp or other object about thirty-five feet distant will pass through the lens to be measured and the lenses H H and fall upon the target F, which is slid upon the gage A until a clear image of the object is obtained, when the correct focus is read off from the edge of the gage marked "Convex."

To measure concave lenses of medium or light power, it is necessary to turn the slide D behind B and read the focus from the center of the gage A, where it is marked "Concave 8 to 72." To measure strong concave lenses, both slides C and D must be used behind B, and the focus will then be read from the edge of the gage marked "Concave 3 to 8."

The head B may have one or more lenses, and the gage A may have one or more series of figures. The head B may be used with or without the slides C D, or with a greater number of slides; or the target F may be fixed to the gage A, and the head B may slide upon A.

I am aware that boxes or tubes with convex lenses affixed in them have been used to measure lenses, and therefore I do not claim broadly the use of convex lenses to shorten the focal length of lenses to be measured, or to counteract the negative power of concave lenses and insure a positive image in measuring them; but What I do claim as my invention, and desire to secure by Letters Patent, is—

1. In an instrument for measuring lenses, the combination of the head B, having convex lenses H H, gage A, target F, and holder G, substantially as shown and described.

2. The combination of the head B, gage A, target F, and holder G with the slide-plates C and D, having lenses K L, substantially as shown and described.

ANDREW L. SMITH.

Witnesses:
    E. MERRITT COLE,
    E. J. ROGERS.